US009201475B2

(12) United States Patent
Wu et al.

(10) Patent No.: US 9,201,475 B2
(45) Date of Patent: Dec. 1, 2015

(54) ELECTRONIC DEVICE INCLUDING A MOVABLE BAFFLE TO ENHANCE COOLING

(71) Applicant: GIGA-BYTE TECHNOLOGY CO., LTD., New Taipei (TW)

(72) Inventors: Chung Hsin Wu, New Taipei (TW); Shu Mu Lin, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 306 days.

(21) Appl. No.: 13/886,216

(22) Filed: May 2, 2013

(65) Prior Publication Data
US 2014/0160669 A1 Jun. 12, 2014

(30) Foreign Application Priority Data
Dec. 12, 2012 (TW) .............................. 101147005 A (51) Int. Cl.
*G06F 1/20* (2006.01)
*G06F 1/16* (2006.01)

(52) U.S. Cl.
CPC ................ *G06F 1/203* (2013.01); *G06F 1/166* (2013.01); *G06F 1/1681* (2013.01)

(58) Field of Classification Search
CPC ....................... G06F 1/20; G06F 1/203; G06F 2200/201–2200/203; G06F 1/1681; G06F 1/166; G06F 1/1616; H05K 74/20009–7/2019

USPC ....................... 361/679.46–679.54, 688–723; 361/679.26–679.28; 454/184; 174/547, 548
See application file for complete search history.

(56) References Cited

U.S. PATENT DOCUMENTS

| | | | |
|---|---|---|---|
| 5,552,960 A * | 9/1996 | Nelson et al. ............ | 361/679.54 |
| 6,437,978 B1 * | 8/2002 | Ozaki et al. ............. | 361/679.46 |
| 7,950,611 B2 * | 5/2011 | Tracy et al. ................ | 248/176.3 |
| 8,014,147 B2 * | 9/2011 | Chen et al. ............... | 361/679.56 |
| 2010/0246106 A1 * | 9/2010 | Chiu ........................ | 361/679.01 |
| 2014/0133095 A1 * | 5/2014 | Wu et al. ....................... | 361/692 |

* cited by examiner

*Primary Examiner* — Zachary M Pape
(74) *Attorney, Agent, or Firm* — Chun-Ming Shih (57) ABSTRACT

An electronic device includes a first body, a second body, a baffle and a drive mechanism. The second body includes an opening the bottom surface thereof, and the baffle is disposed on the bottom surface to cover the opening. The baffle moves with respect to the second body and has a raised portion. The drive mechanism includes a pivot, a linkage and a sliding member. The pivot connects the first body and the second body. The linkage is sleeved over the pivot. The sliding member is connected to the linkage and has a pushing portion. While the first body rotates with respect to the second body, the pivot rotates with the first body and drives the linkage to push the sliding member. In the meantime, the sliding member displaces to push the raised portion by the pushing portion, so that the baffle moves and exposes part of the opening.

11 Claims, 14 Drawing Sheets

ELECTRONIC DEVICE INCLUDING A MOVABLE BAFFLE TO ENHANCE COOLING

CROSS-REFERENCES TO RELATED APPLICATIONS

This non-provisional application claims priority under 35 U.S.C. §119(a) on Patent Application No. 101147005 filed in Taiwan, R.O.C. on Dec. 12, 2012, the entire contents of which are hereby incorporated by reference.

BACKGROUND

1. Technical Field

This disclosure relates to an electrical device, and more particularly to an electrical device which can move a baffle to expose an opening for enhancing cooling effect for the electronic device.

2. Related Art

Nowadays, the portable electronic products, such as laptop computers, tablet PCs, ultra mobile personal computers, etc, have gradually developed toward miniaturization. The compactness brings advantage of easy carrying and enhances the convenience of usage However, the compactness also brings some disadvantages. With limited available internal spaces, some portable electronic devices are not equipped with fans or other enhancing means for cooling inside. There are many electronic components, such as CPUs, graphics cards, etc., inside the devices. These electronic components generate lots of heat while operating. Take a notebook as an illustration, when the notebook works under high temperature environment with the bottom surface placed on the table, the heat the notebook will not be exhausted in time, and high internal temperature with damage the notebook. Therefore, cooling is an important issue to a compact electronic device.

To solve the cooling issue inside the portable electronic device, the current approach is to set up heat exhausting holes on the bottom surface of the portable electronic device, so as to exhaust heat generated by the electronic components through these heat exhausting holes. A gap between the bottom and the table is required for these heat exhausting holes, therefore pads have to be set up on the bottom of the electronic device to raise the electronic device to keep the aforementioned gap.

Considering the appearance of the electronic device, heat exhausting holes often set up on the bottom of the electronic device, or the number and area of the holes are limited. However, the current portable electronic devices have pretty high work performance, and generate a lot of heat. Relying only on heat exhausting holes to exhaust the heat is insufficient to drop the operating temperature of the electronic device, so this way can not fulfill the cooling needs of high performance laptops.

SUMMARY OF THIS DISCLOSURE

In view of the above problems, this disclosure provides an electronic device to solve the cooling issue of the current portable electronic devices.

The electronic device of this disclosure includes a motherboard disposed therein, wherein the motherboard is used to execute the default functions of the electronic device. The electronic device includes a first body, a second body, a baffle, and a drive mechanism. The second body pivotally connects to the first body and has an opening on one side thereof. The baffle is disposed on the side with opening of the second body. The baffle moves along a first direction with respect to the second body and has at least one raised portion. The drive mechanism includes a pivot, a linkage, and a sliding member. Two ends of the pivot respectively connect the first body and the second body. The linkage is sleeved over the pivot. The sliding member connects to the linkage and the sliding member has at least a pushing portion located at the position corresponding to the pushing portion of the baffle.

When the first body rotates with respect to the second body, the first body drives the pivot to rotate, and the pivot drives the linkage to push the sliding member. Meanwhile, the sliding member moves along a second direction and the pushing portion pushes the raised portion of the baffle, such that the baffle moves along the first direction to cover or expose part of the opening. Here the first direction is perpendicular to the second direction.

When the first body is opened and the electronic device operates, the first body also drives the baffle to move and to expose at least part of the opening on the bottom surface, so as to increase the cooling space under the electronic devices and enhance the internal airflow circulating. Therefore, the heat dissipating efficiency is enhanced while the compactness requirement of portable electronic devices is simultaneously satisfied.

These and other objects and advantages of this disclosure can be better appreciated from the following detailed description of this disclosure, taken in conjunction with the attached drawings.

BRIEF DESCRIPTION OF THE DRAWINGS

This disclosure will become more fully understood from the detailed description given herein below for illustration only, and thus not limitative of this disclosure, wherein.

DETAILED DESCRIPTION OF THIS DISCLOSURE

Figure 1:
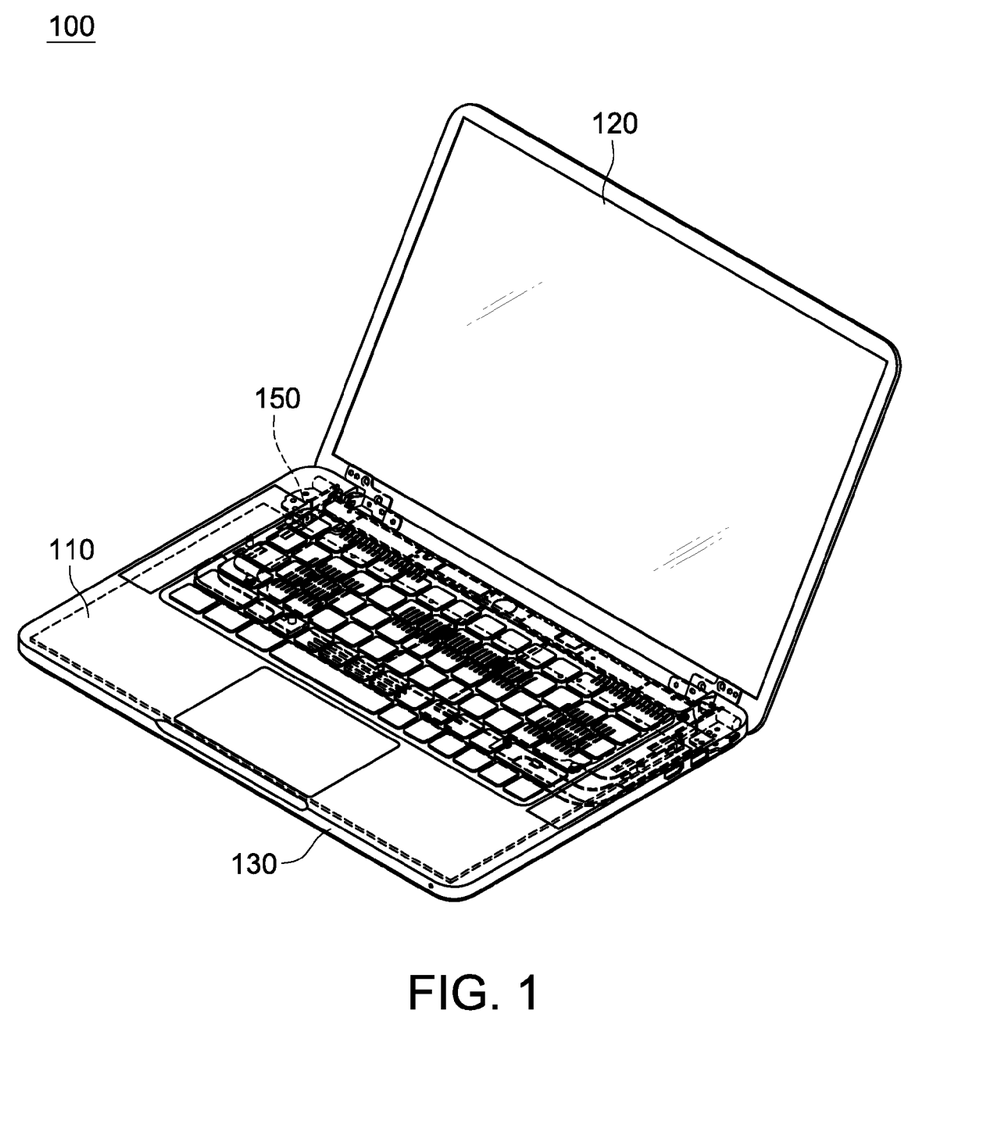
FIG. 1 is a perspective view of the electronic device according to a first embodiment.
Figure 2A:
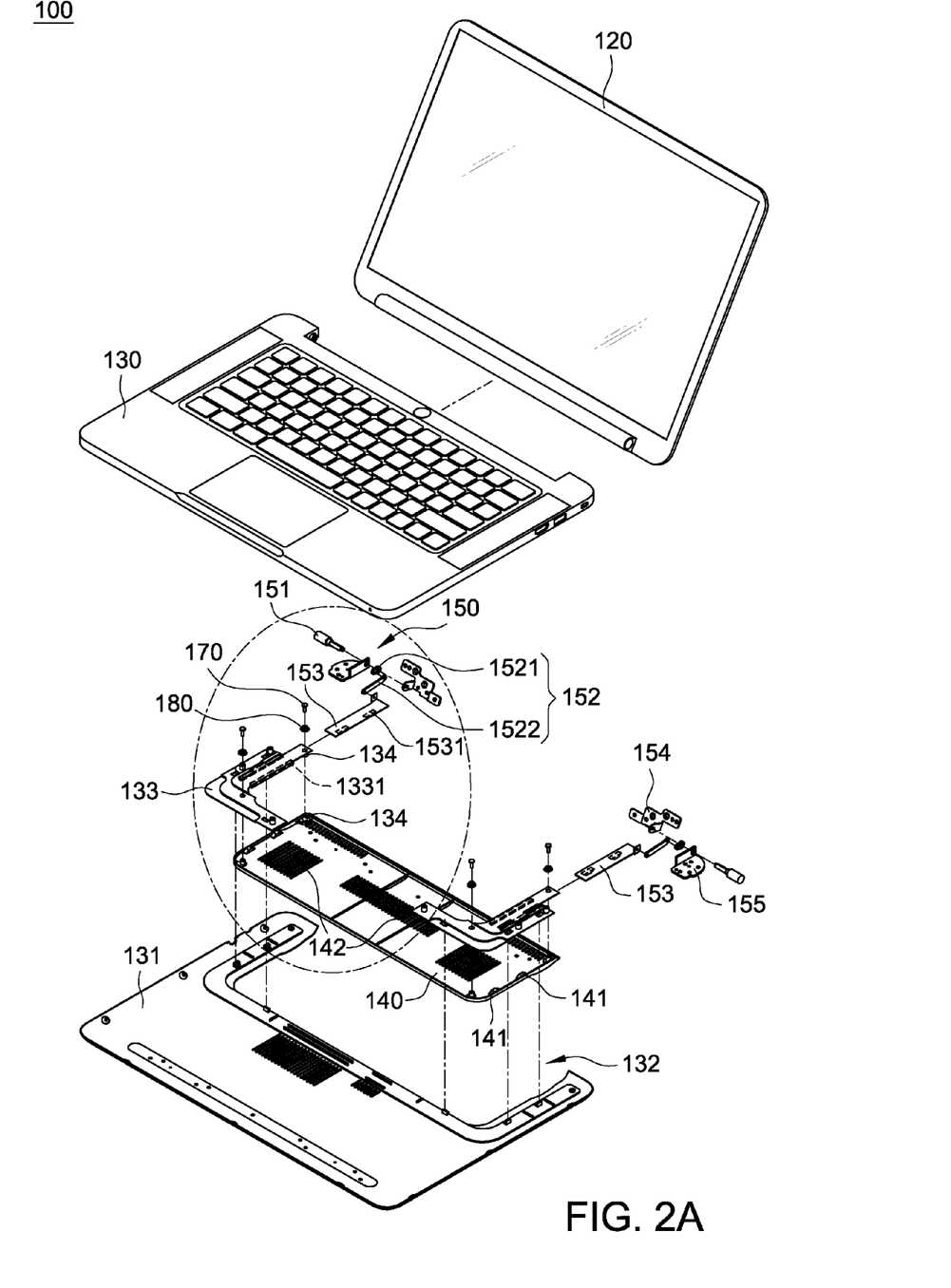
FIG. 2A is an exploded view of the electronic device according to the first embodiment.
Figure 2B:
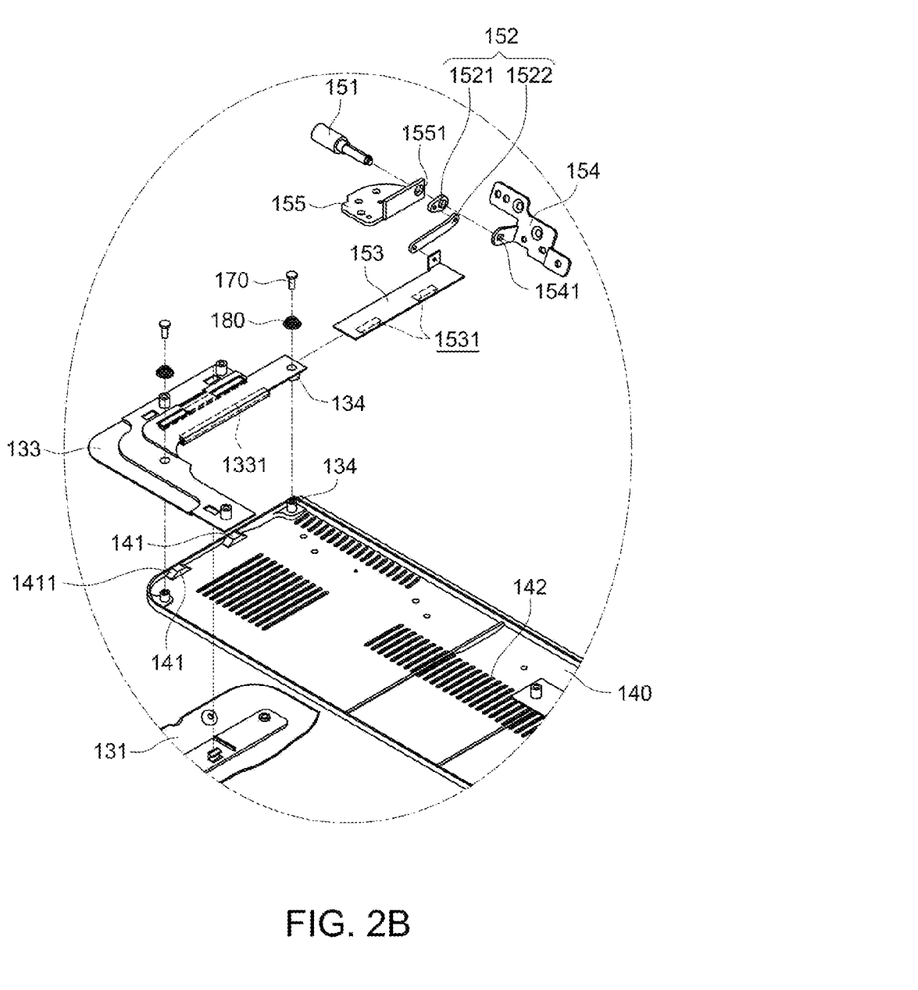
FIG. 2B is a partial exploded view of the electronic device according to the first embodiment.

Refer to FIG. 1, FIG. 2A, and FIG. 2B, an electronic device 100 according to the first embodiment of this disclosure is equipped with a motherboard 110 disposed inside the electronic device 100. The motherboard 110 is electrically configured with a plurality of electronic components to execute default functions of the electronic device 100. It is noted that the electrical device 100 described in this disclosure can be but not limited to a desktop computer, a laptop computer, or any electronic device that can be connected to computer peripheral devices. The following detailed description of this disclosure will use a laptop computer as an illustration. The attached drawings are for reference and description purposes only, not to limit this disclosure.

Refer to FIG. 1, FIG. 2A and FIG. 2B, the electronic device 100 includes a first body 120, a second body 130, a baffle 140, and a drive mechanism 150. In the present embodiment, the first body 120 is a display of the electronic device 100 and the second body 130 is a host of the electronic device 100. The motherboard 110 is disposed in the second body 130. The first body 120 is pivotally connected to the second body 130, and the detailed connecting mechanism will be described later. The bottom surface 131 of the second body 130 has an opening 132 disposed near the edge of the second body 130. The interior of the second body 130 communicates the outside through the opening 132. It is noted that the opening 132 could also choose to set up on the other side of the second body 130, not limited as described herein.

In addition, the bottom surface 131 of the second body 130 further has a plurality of pads 160 respectively disposed on the respective corners of the second body 130, so that the second body 130 is raised to a certain height for use convenience when placed on a plane.

The baffle 140 is disposed on the bottom surface 131 of the second body 130, and the size of the baffle 140 matches or is large than that of the opening 132, so that the baffle 140 can cover the opening 132. Besides, at least one raised portion 141 is disposed on one side of the baffle 140 and the raised portion 141 has a first inclined plane 1411.

The second body 130 includes a connecting member 133, and the connecting member 133 and the baffle 140 respectively have a plurality of corresponding junctions 134. By a plurality of fixing elements 170, such as bolts or rivets, running through the junctions 134 of connecting member 133 and baffle 140, the baffle 140 is combined with the connecting member 133, and the baffle 140 can move along a first direction D1 to and fro with respect to the second body 130, so as to expose or cover at least part of opening 132. It is noted that the first direction D1 described in the embodiment is perpendicular to the bottom space 131 of the second body 130.

The electronic device 100 further includes a plurality of elastic elements 180. In the present embodiment, the elastic elements 180 are tension springs. Elastic elements 180 are sleeved over the fixing elements 170, with one end of each elastic element 180 connecting to the connecting member 133 and the other end of each elastic element 180 connecting to the baffle 140. The elastic elements 180 can provide a return tension force along the first direction D1 to the baffle 140, making the baffle 140 stay in the position that covers the opening 132.

As are shown in FIG. 1, FIG. 2a, and FIG. 2B, the drive mechanism 150 includes a pivot 151, a linkage 152, a sliding member 153, a first fixing board 154, and a second fixing board 155. The first fixing board 154 is fixed to the first body 120, and the second fixing board 155 is fixed to the second body 130. The first fixing board 154 has a first aperture 1541, and the second fixing board 155 has a second aperture 1551. Two ends of the pivot respectively run through the first aperture 1541 and the second aperture 1551, so as to pivotally connect the first body 120 to the second body 130. Therefore, the first body 120 can rotate with respect to the second body 130 to the opened position or the closed position.

The linkage 152 includes a first linkage element 1521 and a second linkage element 1522. The first linkage element 1521 is sleeved over the pivot 151. One end of the second linkage element 1522 pivotally connects to the first linkage element 1521, and the other end of the second linkage element 1522 pivotally connects to the sliding member 153 disposed at the position corresponding to the baffle 140. The action of the pivot 151 and the linkage 152 of the drive mechanism 150 can drive sliding member 153 to move along a second direction D2, wherein the second direction D2 is perpendicular to the first direction D1 described above.

The connecting member 133 further has a pair of rails 1331, and the sliding member 153 is combined with the rails 1331. The sliding member 153 moves to and fro along the second direction D2 on the rails 1331. Besides, the sliding member 153 in the embodiment has at least one pushing portion 1531 located at the position corresponding to the raised portion 141 of the baffle 140, and the pushing portion 1531 further has a second inclined plane 1532. The shape of the second inclined plane 1532 matches that of the first inclined plane 1411 of the raised portion 141.

It is noted that the linkage 152 is consist of two link elements, but people having ordinary skill in the art can make proper modification to the configuration of the link elements according to the actual design requirement, not limited to the present embodiment.

Refer to FIG. 2A, FIG. 2B, FIG. 3A, FIG. 3B, and FIG. 3C, when the first body 120 rotates with respect to the second body 130 to the opened position, the pivot 151 connecting the first body 120 are driven to rotate as well, and the pivot 151 drives the linkage 152 to move the sliding member 153. In the meantime, the sliding member 153 moves along the second direction D2, and the second inclined plane 1532 of the pushing portion 1531 pushes the first inclined plane 1411 of the raised portion 141, such that the baffle 140 are forced to move along the first direction due to be pressed by the sliding member 153. As a result, part of the opening 132 is exposed. In this way, the cooling space of the electronic device 100 increases, boosting the airflow between the interior and external of the electronic device 100. The baffle 140 of the present embodiment has a plurality of heat exhausting holes 142, enhancing the cooling performance of the electrical device 100.

Figure 3A:
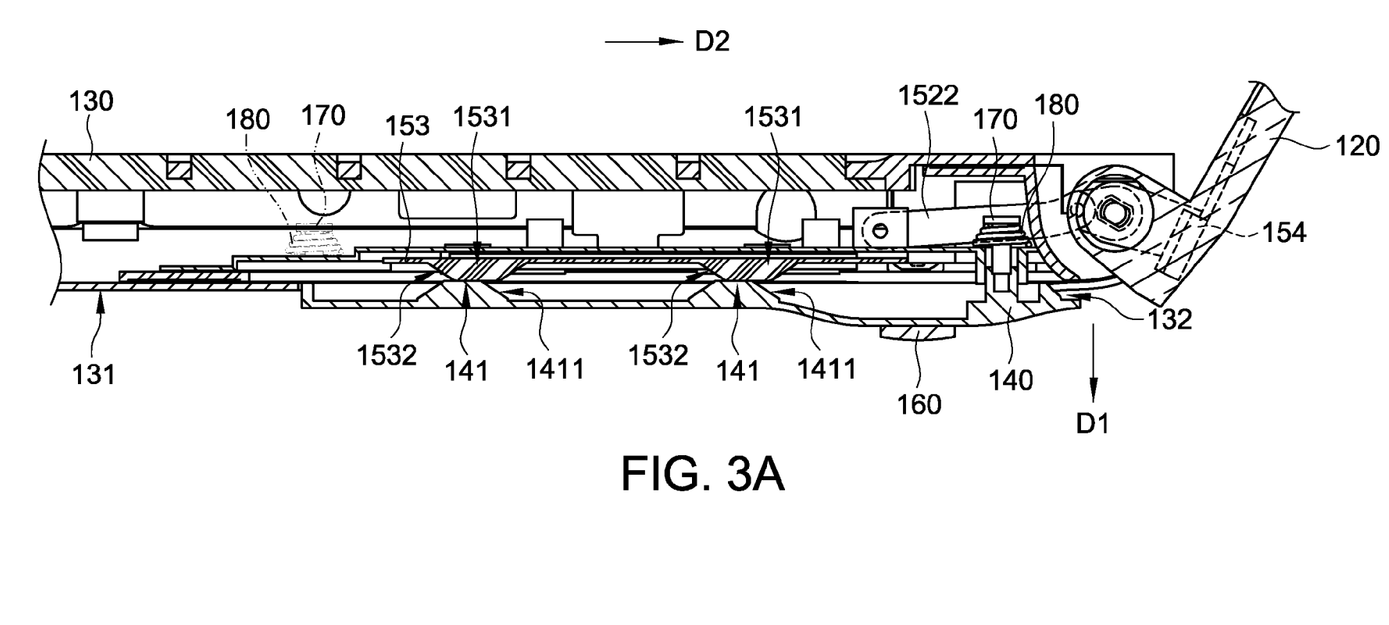
FIG. 3A is a cross-sectional view of the electronic device according to the first embodiment while the first body is in the opened position.
Figure 3B:
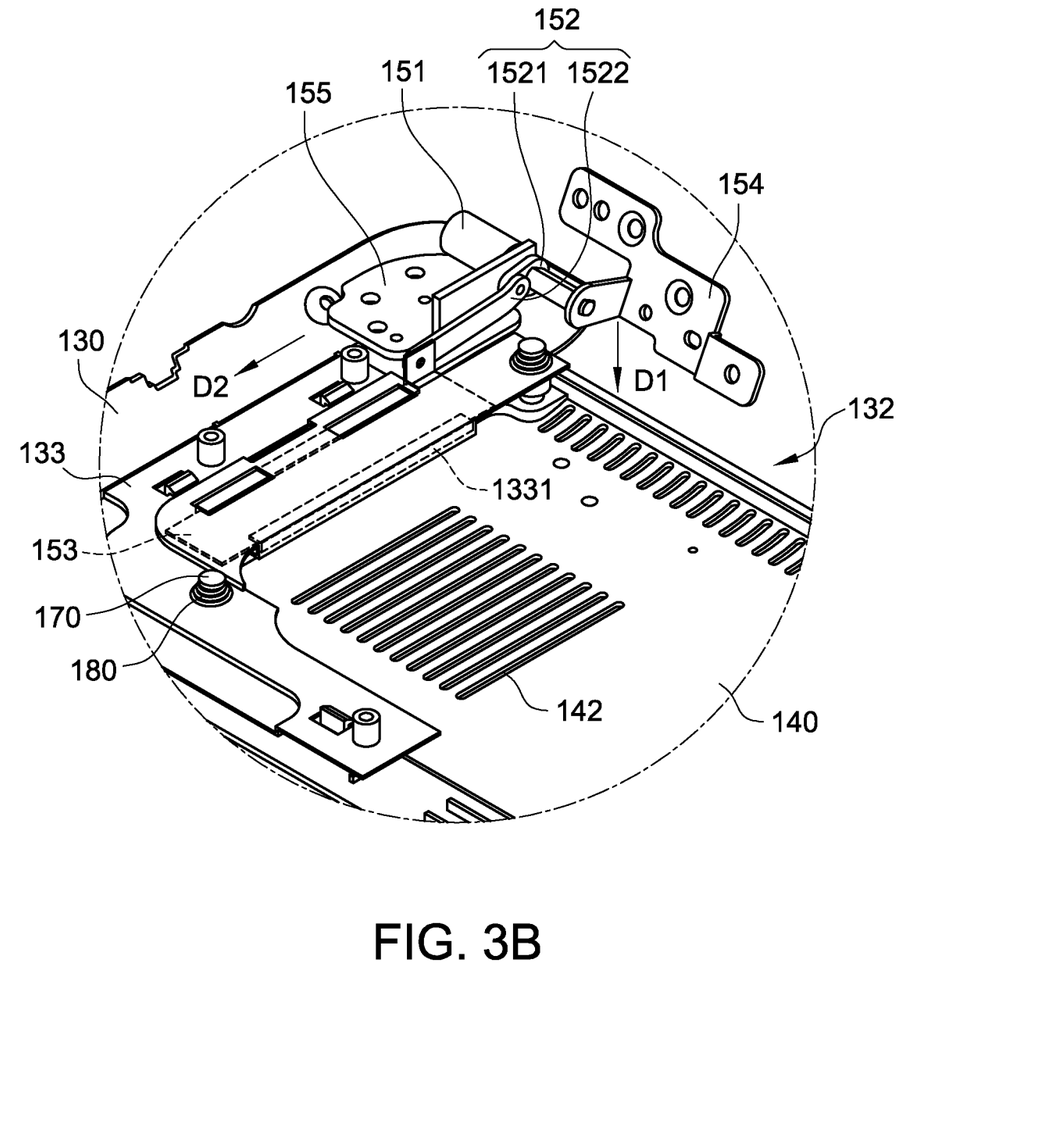
FIG. 3B is a partial enlarged view of the electronic device according to the first embodiment while the first body is in the opened position.
Figure 3C:
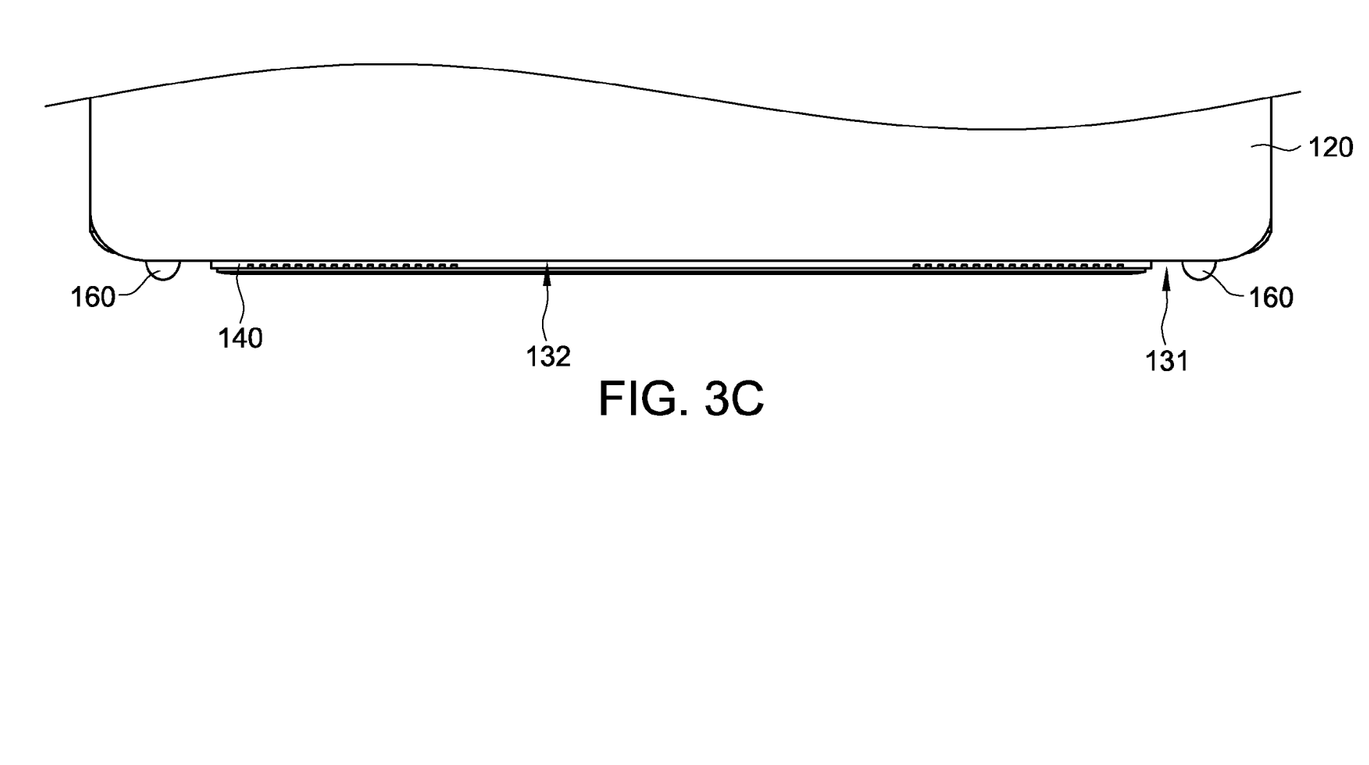
FIG. 3C is a rear view of the electronic device according to the first embodiment while the first body is in the opened position.
Figure 4A:
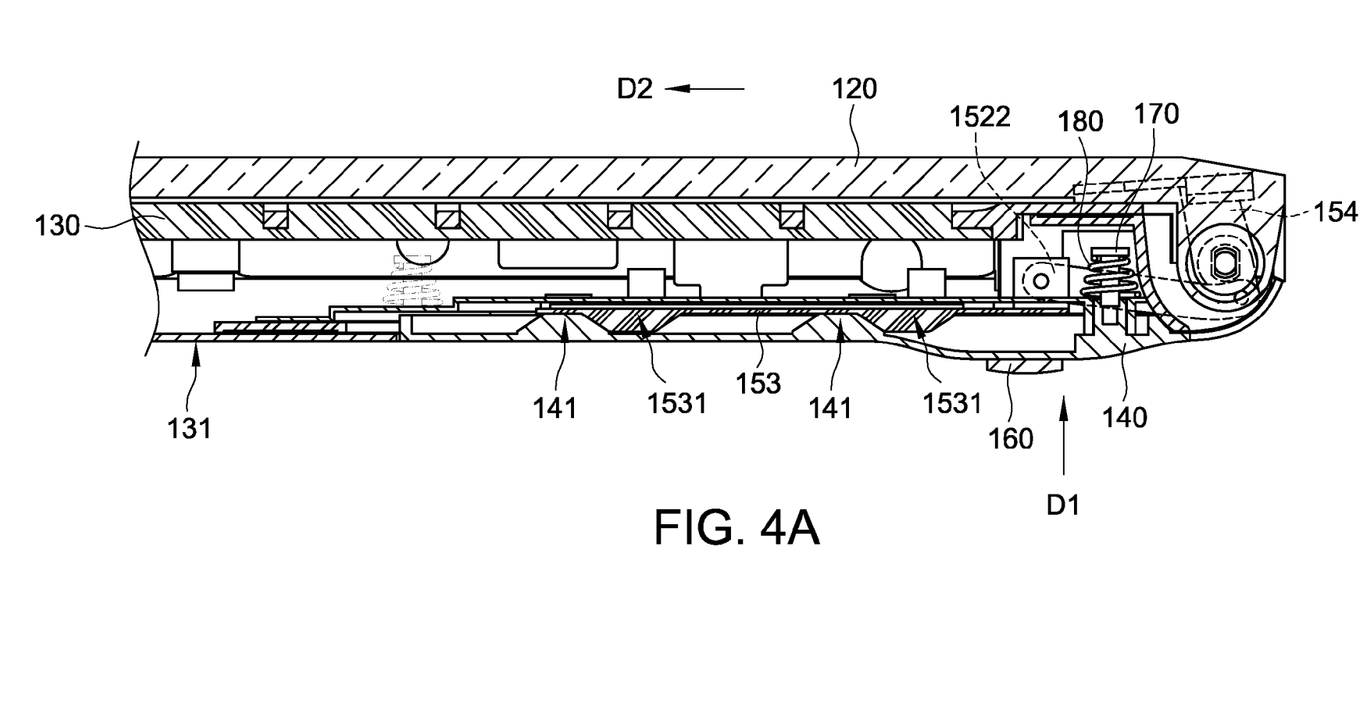
FIG. 4A is a cross-sectional view of the electronic device according to the first embodiment while the first body leaves the opened position.
Figure 4B:
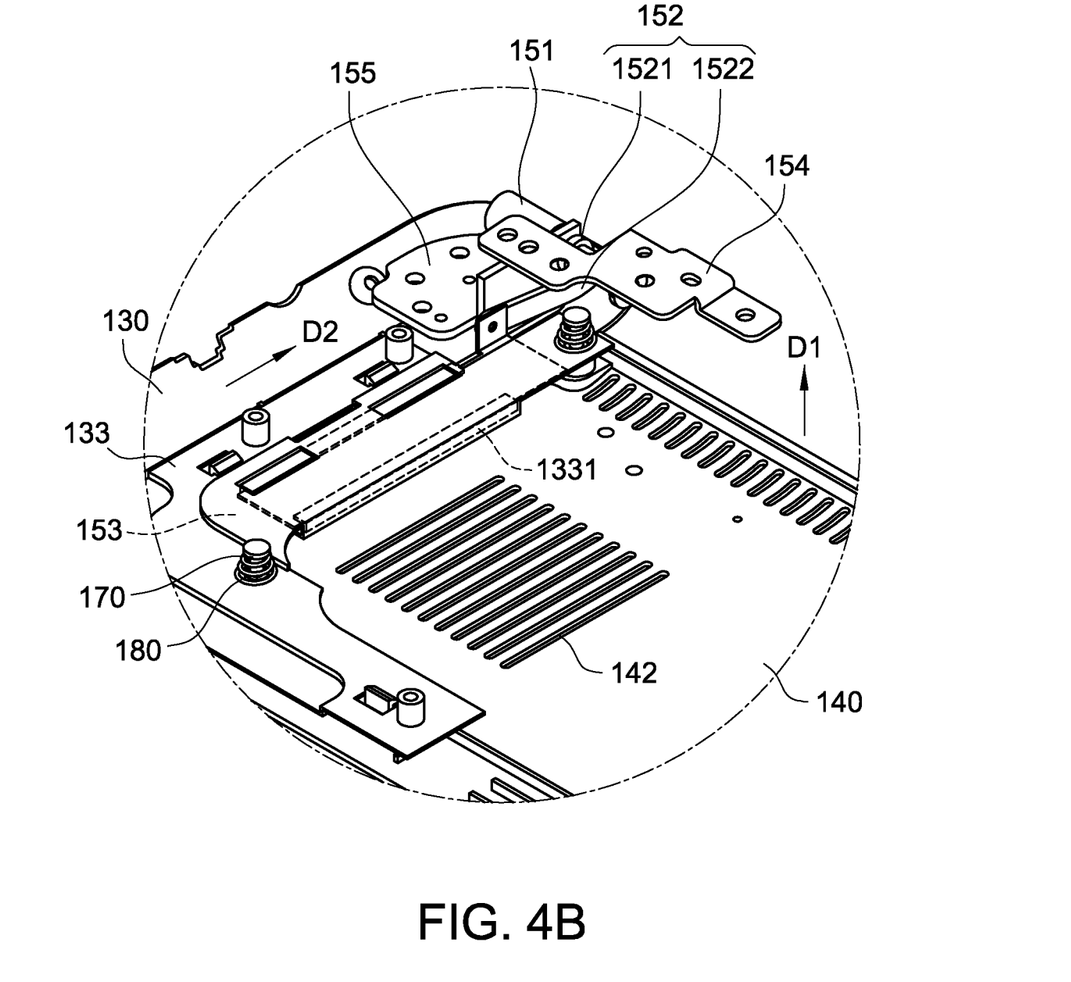
FIG. 4B is a partial enlarged schematic view of the electronic device according to the first embodiment while the first body leaves the opened position.
Figure 4C:
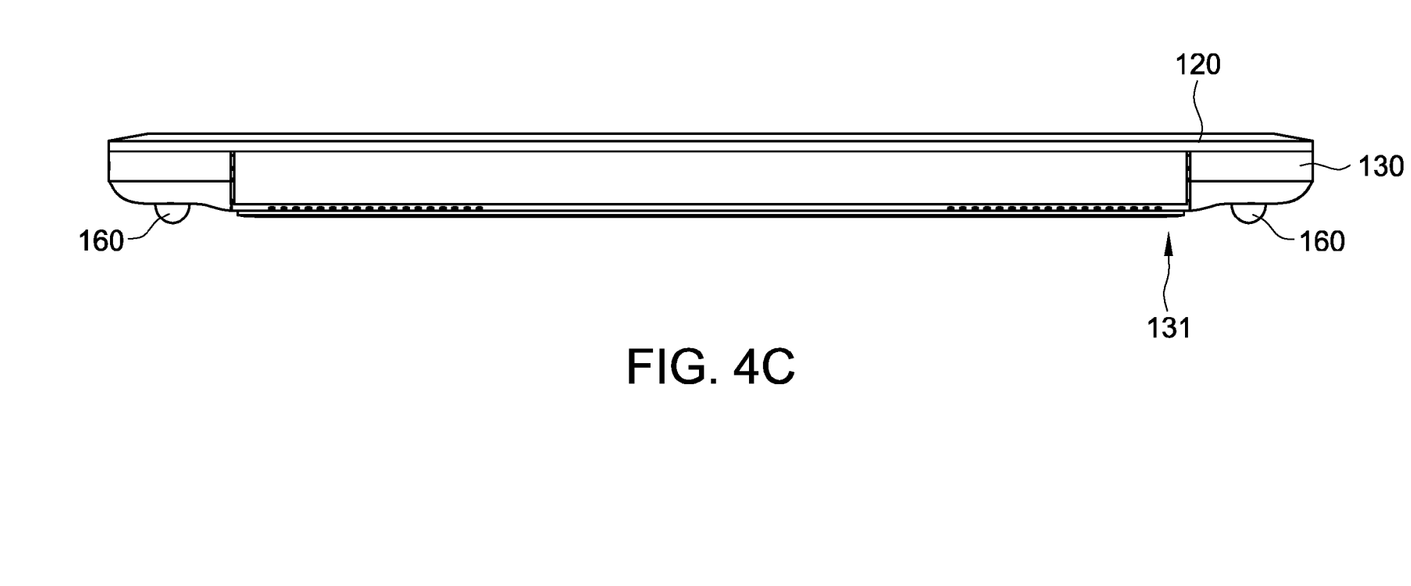
FIG. 4C is a rear view of the electronic device according to the first embodiment while the first body leaves the opened position.
Figure 5:
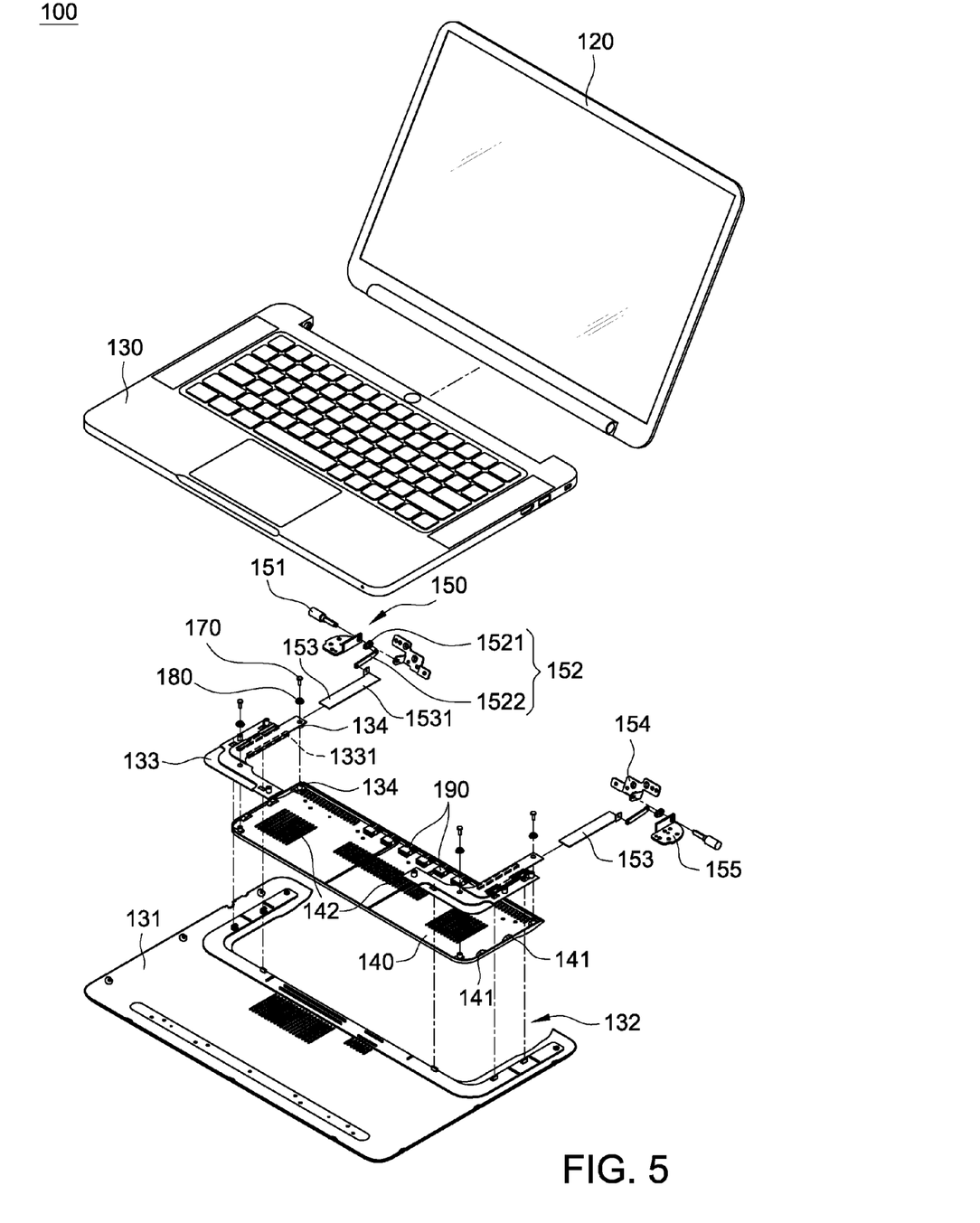
FIG. 5 is an exploded view of the electronic device according to a second embodiment.

The baffle 140 of the embodiment outwardly moves along the first direction D1 by the pushing of the pushing portion 1531 of the sliding member 153, so the height of pushing portion 1531 of the sliding member 153 and the displacement distance of baffle 140 are closely related. To further explain, when the pushing portion 1531 presses against the raised portion 141 of the baffle 140 by the guidance of the guiding inclined place 1411 and 1532, the height of the pushing portion 1531 is substantially the same with the distance between the baffle 140 and the bottom surface 131 of the second body 130. Therefore, the baffle 140 will stay in a fixed range of displacement, so the opening 132 will not be exposed too much, avoiding larger dirt or dust from entering the interior of the second body 130 from the opening 132. Meanwhile, when the first body 120 is in the opened position, the elastic elements 180 are in stretched state.

Besides, the maximum distance between baffle 140 and the bottom surface 131 of the second body 130 is shorter than the height of the pads 160, so that the baffle 140 will not interferes the second body 130 while in use, that is, the electronic device 100 will stay fixed when placed on a plane without being influenced by the baffle 140.

It is noted that this disclosure does not limit displacement distance of the baffle 140. People having ordinary skill in the art can make proper modification to adjust the height of the pushing portion 1531 of the sliding member 153 to change the maximum displacement distance of baffle 140 according to actual conditions. The maximum displacement distance of the baffle 140 can even be larger than the height of the pads 160, not limited to the embodiments of this disclosure herein.

Refer to FIG. 2A, FIG. 2B, FIG. 4A, FIG. 4B, and FIG. 4C, when the first body 120 rotates with respect to the second body 130 and leaves the opened position, for example, the first body 120 rotates to the closed position when electronic device 100 is not in use, the pivot 151 connecting the first body 120 are driven to rotate as well, and the pivot 151 drives the linkage 152 to move the sliding member 153. In the meantime, the sliding member 153 moves in the opposite direction, so that the pushing portion 1531 leaves the raised portion 141 of the baffle 140. Hence, the sliding member 153 does not apply a pushing force to the baffle 140, and the elastic elements 180 respectively connecting to connecting member 133 and the baffle 140 provide restoring pull force. From the stretched state back to the initial state, the elastic elements 180 pull the baffle 140 back to the position to cover the opening 132, and appearance of second body 130 remains integrally.

Refer to FIG. 5 to FIG. 7B, the structure of the electronic device 100 of the second embodiment is similar to that of the first embodiment. The difference lies in that the electronic device 100 of the second embodiment further includes an electronic port 190. The electronic port 190 can be but not limited to HDMI port, USB port, and network adapter port. The electronic port 190 is disposed on the side surface, facing the interior of the second body 130, of the baffle 140. The electronic port 190 electronically connects with motherboard 110 by flexible electronic connecting elements such as flexible cables or a flexible circuit board.

Figure 6A:
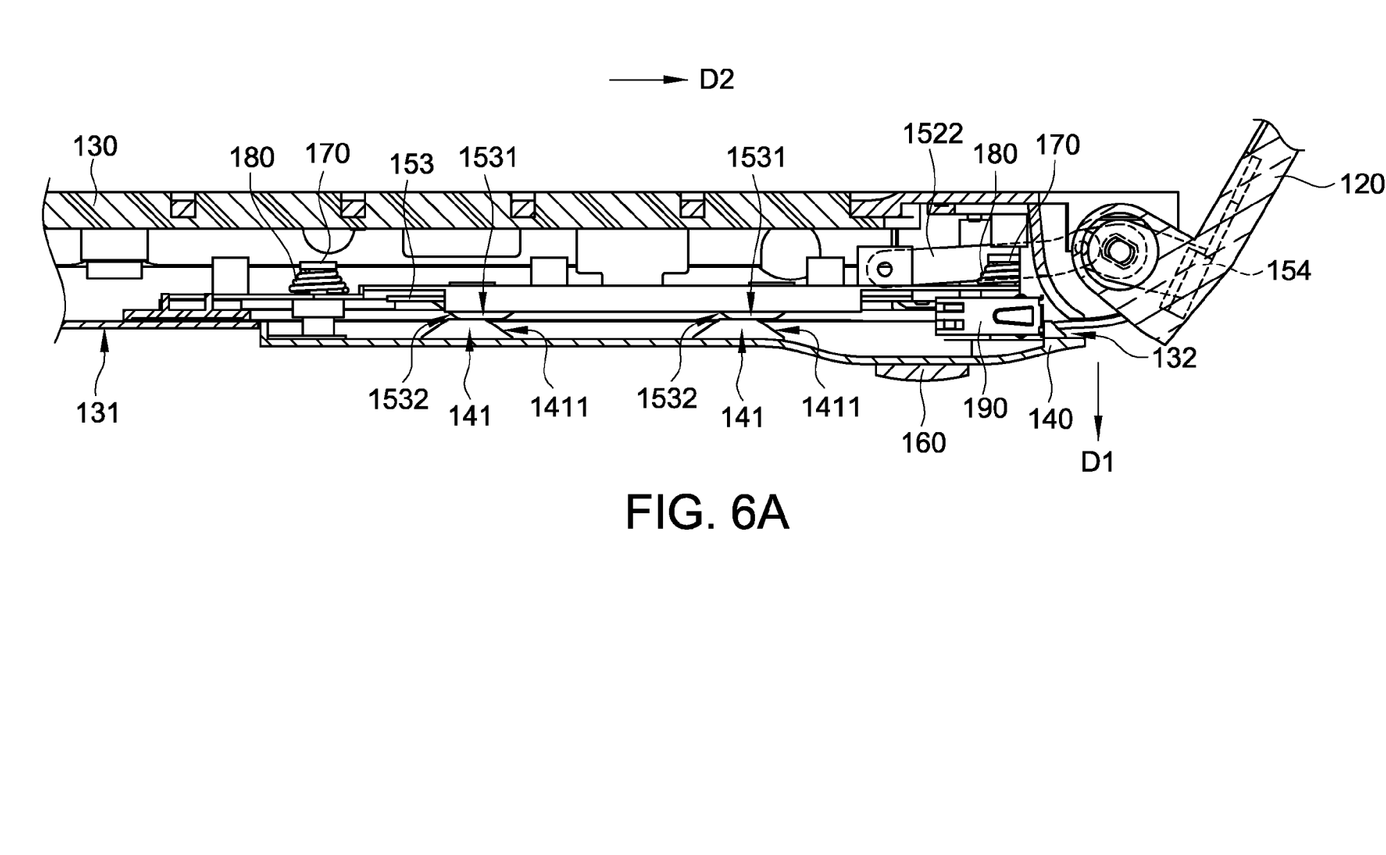
FIG. 6A is a cross-sectional view of the electronic device according to the second embodiment of while the first body is in the opened position.
Figure 6B:
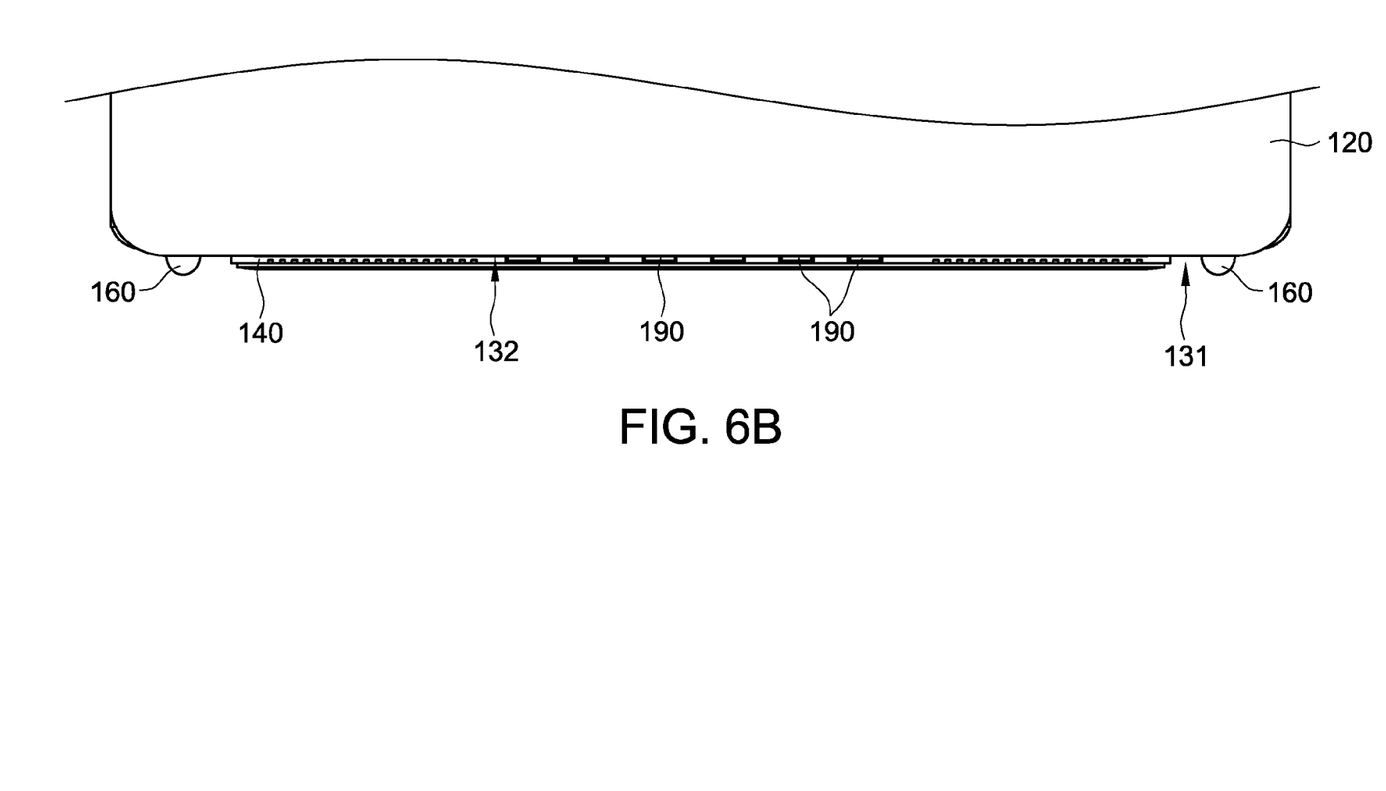
FIG. 6B is a rear view of the electronic device according to the second embodiment while the first body is in the opened position.

As shown in FIG. 6A and FIG. 6B, when the baffle 140 moves with respect to the second body 130 and exposes part of the opening 132, the electronic port 190 will be exposed through the opening 132 with the movement of the baffle 140. And the computer peripheral devices (not shown in the figures) can electronically connect electronic device 100 through the electronic port 190. The electronic port 190 of the embodiment can be completely exposed by the exposure of the opening 132, such that users can electronically insert the electronic connections of the computer peripheral devices into the electronic port 190.

Figure 7A:
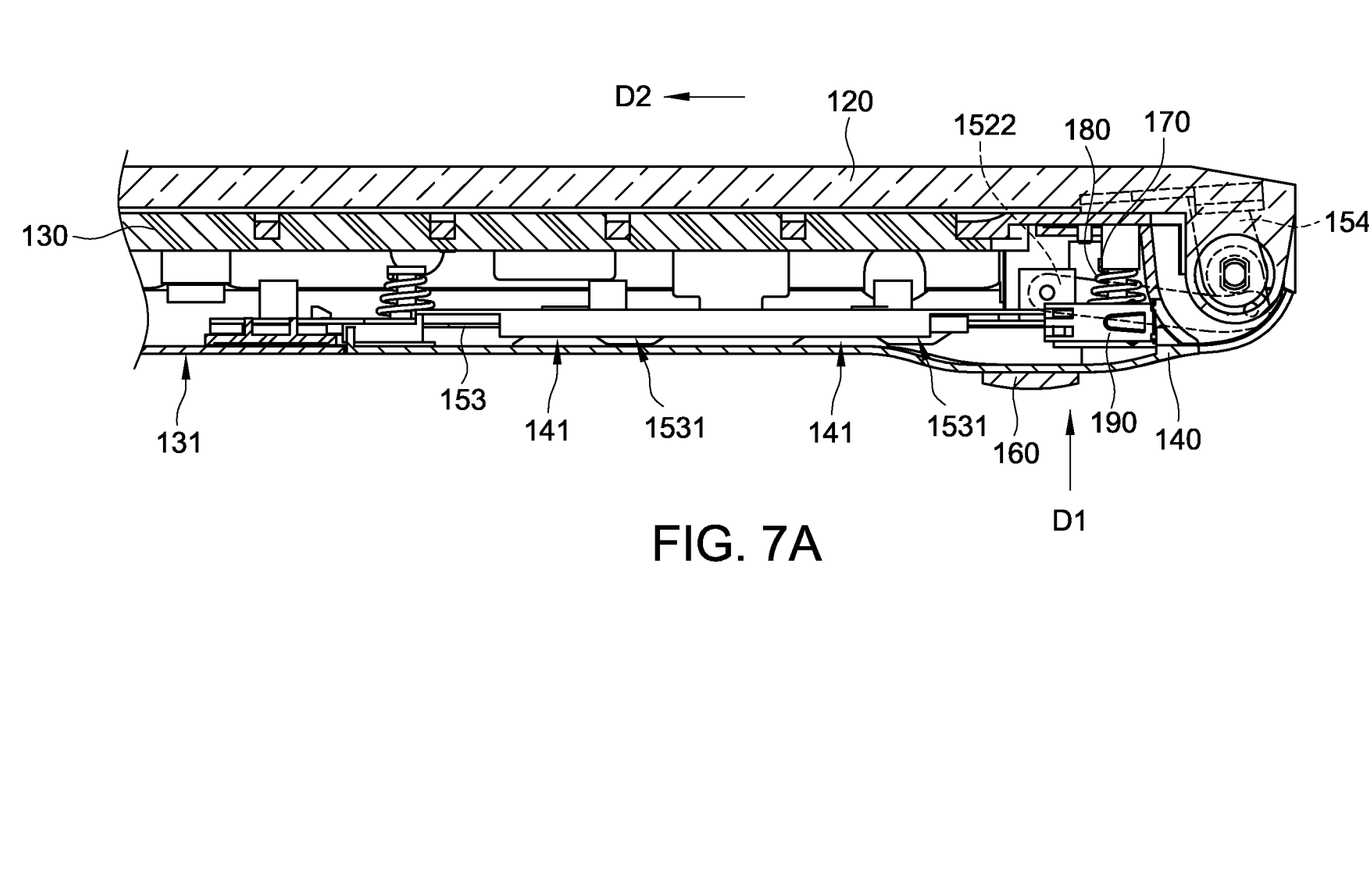
FIG. 7A is a cross-sectional view of the electronic device according to the second embodiment of while the first body leaves the opened position.
Figure 7B:
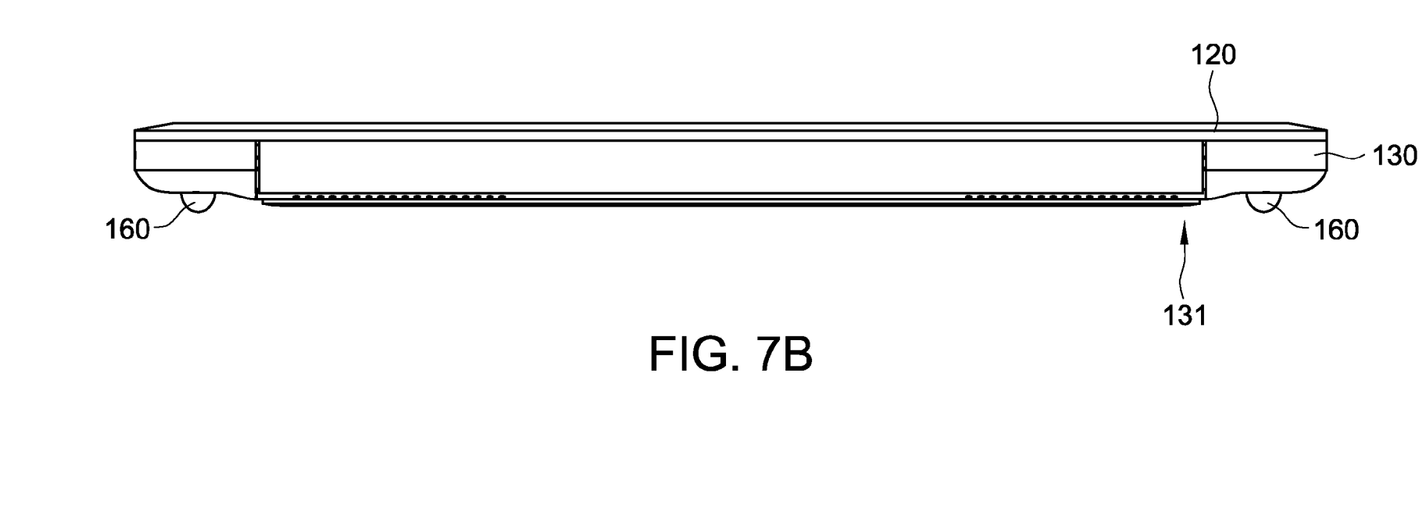
FIG. 7B is a rear view of the electronic device according to the second embodiment while the first body leaves the opened position.

As shown in FIG. 7A and FIG. 7B, when the first body 120 rotates with respect to the second body 130 and leaves the opened position, the baffle 140 will be pulled by the elastic elements 180 and cover the opening 132. In the meantime, the electronic port 190 will move into the interior of the second body 130, making the appearance of the second body 130 remains integrally.

The following table shows the measurement of the operating temperatures of main electronic components of the electronic device of the prior art and this disclosure:

|  | The electronic device in the art | The electronic device of this disclosure |
| --- | --- | --- |
| System environment | 26.3° C. | 25.3° C. |
| Center processor unit | 99.0° C. | 85.3° C. |
| Graphics processing unit | 94.0° C. | 88.0° C. |
| Platform controller hub | 90.0° C. | 85.0° C. |

From the above table, we can clearly know that when the electronic device 100 of this disclosure is in use, by driving the drive mechanism 150 to push the baffle 140 to expose part of the opening 132, the electronic device 100 is efficiently cooled to lower overall operating temperature of the electronic device 100. The drive mechanism 150 and baffle 140 of this disclosure do not occupy extra internal space of the electronic device 100. Therefore, the electronic device 100 of this disclosure has both high cooling performance and compact feature.

Though the embodiments of this disclosure are disclosed as described above, this is not to limit this disclosure. Those skilled in the art will recognize that this disclosure can be practiced with modification within the spirit and scope of the claim. It is therefore to be understood that this disclosure is not to be limited by the foregoing description but only by the appended claims.

What is claimed is:

1. An electronic device with a motherboard disposed inside to process default functions of the electronic device, comprising:
    a first body;
    a second body, pivotally connected to the first body, wherein the second body includes an opening on one side of the second body;
    a baffle, disposed on the side with the opening, for moving along a first direction with respect to the second body, and including at least one raised portion; and
    a drive mechanism, including:
    a pivot, having two ends respectively connected to the first body and the second body;
    a linkage, sleeved over the pivot; and
    a sliding member, connected to the linkage, and having at least one pushing portion located at the position corresponding to the raised portion of the baffle;
    wherein when the first body rotates with respect to the second body, the first body drives the pivot to rotate, the pivot drives the linkage to move the sliding member along a second direction and the pushing portion pushes the raised portion of the baffle, the baffle moves along the first direction to cover or expose part of the opening, and the first direction is perpendicular to the second direction.

2. The electronic device as claimed in claim 1, wherein the drive mechanism further includes:
    a first fixing board, fixed to the first body and having a first aperture;
    a second fixing board, fixed to the second body and having a second aperture;
    wherein two ends of the pivot respectively run through the first aperture and the second aperture.

3. The electronic device as claimed in claim 1, wherein the linkage further includes:
    a first linkage element, sleeved over the pivot;

a second linkage element, wherein one end of the second linkage element pivotally connects to the first linkage element, and the other end of the second linkage element pivotally connects to the sliding member.

4. The electronic device as claimed in claim 1, wherein the raised portion of the baffle further includes a first inclined plane, and the pushing portion of the sliding member includes a second inclined plane located at the position corresponding to the first inclined plane; the sliding member pushes the first inclined plane of the raised portion by the second inclined plane of the pushing portion to move the baffle along the first direction.

5. The electronic device as claimed in claim 1, wherein the side with the opening of the second body further includes a plurality of pads, and the maximum distance between the baffle and the side is shorter than the height of each of the pads.

6. The electronic device as claimed in claim 5, wherein the height of the pushing portion is the same with the maximum distance between the baffle and the side.

7. The electronic device as claimed in claim 1, wherein the second body further includes a connecting member, the connecting member and the baffle respectively have corresponding junctions, and a plurality of fixing elements are installed into the junctions of the connecting member and the baffle, such that the baffle is combined with the connecting member; a plurality of elastic elements are sleeved over the fixing elements with one end of each elastic element connecting to the connecting member and the other end of each elastic element connecting to a respective fixing element; and when the first body rotates with respect to the second body, the pushing portion of the sliding member separates from the raised portion of the baffle and the elastic elements pull the baffle back for covering the opening.

8. The electronic device as claimed in claim 7, wherein the elastic elements are tensional springs.

9. The electronic device as claimed in claim 7, wherein the connecting member further includes a rail, and the sliding member is combined with the rail and moves along the second direction on the rails.

10. The electronic device as claimed in claim 1, further including at least one electrical connection port disposed on the baffle, wherein the electrical connection port is electrically connected to the motherboard, and the electrical connection port is exposed through the opening with the movement of the baffle.

11. The electronic device as claimed in claim 1, wherein the baffle further includes a plurality of heat exhausting holes.

* * * * *